Sept. 19, 1961   W. PUFFE   3,000,596
ARRESTING DEVICE FOR AIRCRAFT
Filed Dec. 30, 1959

INVENTOR
WERNER PUFFE
BY
Mestern & Kollin
ATTORNEYS 3,000,596
ARRESTING DEVICE FOR AIRCRAFT
Werner Puffe, Dusseldorf-Eller, Germany, assignor to
Hein, Lehmann & Co. A.G., Dusseldorf, Germany
Filed Dec. 30, 1959, Ser. No. 862,915
Claims priority, application Germany Dec. 31, 1958
14 Claims. (Cl. 244—110)

My patent application filed October 15, 1958, Serial Number 767,307, now abandoned, relates to an arrestor for aircraft which is provided with an arresting cable and a release cable extending across the aircraft runway. The two cables are stretched between main supports which can be folded down, and which are arranged one on each side of the runway. When ready for use, the main supports lie substantially flat and hold the release cable at a suitable distance above the runway. If in the event of an unsucceessful take-off or landing the front wheel strut of the aircraft hits the release cable, the main struts are released so that they quickly move upwards, putting the arresting cable in position for arresting the aircraft. Although arresting devices of this kind are quite satisfactory in use, they have certain disadvantages, as they are relatively complicated in construction and difficult to handle, the difficulty being mainly due to the fact that the main struts require relatively powerful driving means to swing them into the arresting position, because considerable inertia has to be overcome.

The present invention is concerned with the problem of further developing and improving the arrestor described in said application No. 767,307 so that it gives completely satisfactory performance in spite of a much lighter construction and easier handling.

In accordance with the present invention this is mainly achieved by the fact that in a position of readiness the main struts are upright, the release cable acts on the upper ends of the main struts and the arresting cable on the lower ends, a gripping device for the arresting cable being provided and being longitudinally movable along the main struts. When the aircraft hits the release cable, the gripping device moves upwards and thereby carries the arresting cable into the arresting position. The main struts are preferably cylindrical and the gripping device is preferably in the form of a piston longitudinally displaceable inside the cylinder and connected with the release cable through a cable which passes around a system of pulleys. This results in a considerably simplified arresting device, because the main struts are in the upright position when the gripping device is ready for action, so that they need not be swung upwards for release. In fact, for release of the aircraft it is only necessary for the arresting cable to be raised, the energy required for this being derived from the aircraft itself by way of the release cable, which is tensioned when the aircraft hits it.

The piston for the arresting cable can be held in its upper arresting position by one or more locking devices, for example by means of locking pawls arranged in the cylinder housing of the main struts. The piston should preferably also have means for holding it in the lower position of readiness, for example a locking pawl constructed and arranged in such a way that it will not release the piston until a certain minimum tension has been exceeded. This tension is developed in the connecting cable leading to the piston when the aircraft encounters the release cable.

The cylindrical main struts are provided with spring- and damping means which tend to bring and hold the struts in the upright position. When the struts are folded down, in the position of rest, they are held in position by a locking device which is operated either manually or by remote control, as for example by an electromagnetically controlled locking pawl.

A disconnecting device is preferably provided between the arresting cable and the retaining piston on the one hand and between the release cable and the connecting cable leading to the piston on the other hand.

Further details of the invention will now be described with reference to an example shown mainly diagrammatically in the accompanying drawing in which.

Figures 3, 4, 5:
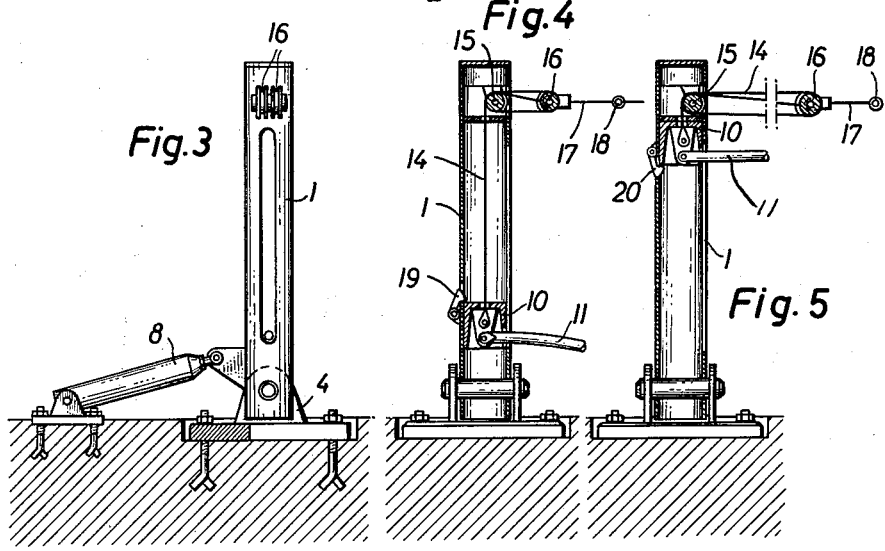
FIGURE 3 is a side view of the device with the supporting cylinder in the arresting position.
FIGURE 4 is a vertical longitudinal section through the upright supporting cylinder with the arresting cable in the position of readiness.
FIGURE 5 is a section similar to FIGURE 4, but with the arresting cable in the position for arresting.

The new arresting device comprises a pair of elongated support members in the form of cylindrical main struts 1 which are disposed one on each side of either a take off or a landing runway, and an arresting cable 2 and a releasing cable 3 which are stretched between the struts. The struts 1, only one of which has been shown in the drawing, have one end pivotally mounted in a bearing 4 in a foundation 5 which is anchored to the ground. A forked arm 6 is provided on the lower end of the main strut 1. A piston rod 7 of a spring and damping device 8 which seeks to bring and hold the supporting cylinder 1 in its upright position as shown in FIGURE 3 acts on the arm 6. The spring and damping device 8 is also mounted pivotally in a foundation 9.

A piston 10 is longitudinally movable inside the strut 1. The piston carries the arresting cable 2 by way of carrier cable 11, a rigging screw 12, and a shear bolt 13. A connecting cable 14 which is guided by a pulley system consisting of fixed sheaves 15 and loose sheaves 16 acts on the upper end of the piston 10. The sheaves 16 are connected to the release cable 3 through a supporting cable 17 and a shear bolt 18. An adjustable tensioning device, such as a rigging screw, not shown in the drawing is preferably also provided here as for the arresting cable.

The retaining piston 10 is held in its lower position of readiness by a locking pawl 19 disposed in the cylinder 1. The locking pawl 19 is so arranged and constructed that it does not release the piston 10 until a certain minimum tension has been exceeded which is developed in the connecting cable 14 when an aircraft meets the release cable 3. In its upper position, as shown in FIGURE 5, the retaining piston 10 is also held by a locking pawl 20. In some circumstances it may be desirable to provide several such locking pawls in the cylinder housing 1, in order to be able to hold the piston 10 in arresting positions at different levels.

In order to hold the strut 1 in its lower position of rest (FIGURES 1 and 2) against the action of the spring- and damping means 8, a locking pawl 21 is provided, the catch of which engages in a recess at the free end of the cylinder 1. The locking pawl 21 may be disengaged by hand. It is, however, preferable to provide a remote control, for example an electromagnetically actuated switch 22 which when energised swings the locking pawl 21 outwards and thereby allows the strut 1 to swing upwards into its upright position as shown in FIGURE 3.

Figure 1:
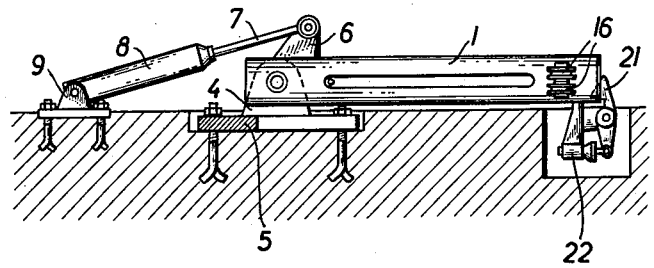
FIGURE 1 is a side view of the new arresting device with a supporting cylinder in the position of rest.
Figure 2:
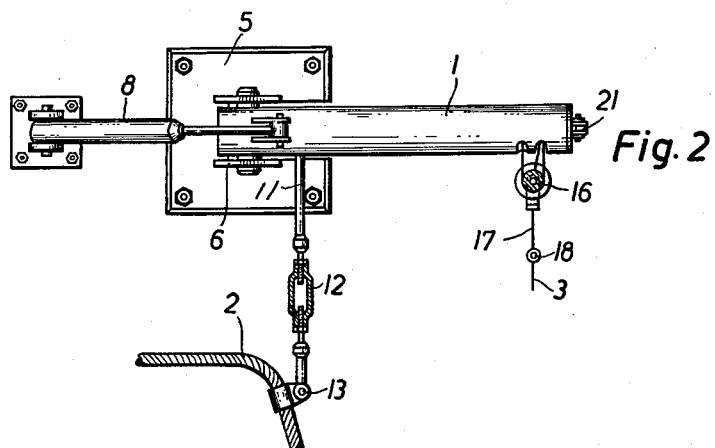
FIGURE 2 is a plan view of the device shown in FIGURE 1.

In the position of rest shown in FIGURES 1 and 2, in which the supporting cylinder 1 is folded down, the arresting cable 2 and the release cable 3 lie flat on the ground, so that it is quite safe for aircraft or other vehicles to run over them. The locking pawl 21 is actuated to put the strut 1 into its upright position. The strut 1 swings into the upright position shown in FIGURE 3 under the action of the spring and damping device 8. The arresting cable 2 remains on the ground but the release cable 3 is raised, so that it is stretched at a predetermined level across the runway. If an aircraft hits the release cable 3 with its front-wheel strut, the cable 3 is carried forwards with it. This pulls the piston 10 upwards by way of the sheaves 15 and 16 and the connecting cable 14, until the piston is locked in its uppermost position by the locking pawl 20, so that it cannot slip down. The upward movement of the piston 10 also moves the arresting cable 2 into its arresting position, as it is fixed to the piston through the retaining cable 11. The legs carrying the main landing wheels of the aircraft therefore move against the arresting cable 2 and carry this along with them. As the aircraft continues to move forwards, the shear bolt 8 which holds the release cable 3 shears off. This takes the load off the front wheel strut of the aircraft. If the aircraft rolls further forward, the arresting cable 2 is increasingly tensioned until finally the shearing bolt 13 holding the cable 2 is also sheared off, the arresting cable 2 being thus released from the main struts 1. This completes the actual arresting operation. The kinetic energy of the aircraft is dissipated by way of the arresting cable 2 by braking devices arranged at the two ends of the cable. A braking device for this purpose, which is not shown in the drawing, may consist of a hydraulic damping cylinder preferably arranged in the ground and having a brake piston connected to the arresting cable. Other devices may be used instead, for example heavy brake chains connected to the ends of the arresting cable.

During the arresting operation, the sheaves 15, 16 arranged between the release cable 3 and the connecting cable 14 operate in the reverse manner of a block-and-tackle type pulley hoist, the path of work of the release cable being shortened and the path of the connecting cable being lengthened. The number of rolls 15, 16 may be adapted to the desired path/force ratio of the arresting device in each case.

I claim:

1. An aircraft barrier comprising support members disposed at opposite sides of a runway, an arresting cable and an activating cable spanning said support members, each of said support members being provided with respective carrying means for said arresting cable displaceable from a lowered position of said arresting cable to an elevated position thereof, and transmission means operatively connected to said activating cable for upwardly displacing said carrying means upon entrainment of said activating cable by an aircraft.

2. An aircraft barrier comprising a pair of generally elongated support members disposed at opposite sides of a runway, an arresting cable and an activating cable above said arresting cable spanning said support members, each of said support members being provided with respective carrying means for said arresting cable displaceable longitudinally of said members from a lowered position of said arresting cable to an elevated position thereof, and transmission means operatively connected to said activating cable for upwardly displacing said carrying means upon entrainment of said activating cable by an aircraft.

3. An aircraft barrier comprising a pair of generally elongated support members disposed at opposite sides of a runway, each of said members being pivoted at one extremity for angular displacement from an inoperative, substantially horizontal position to an operative erect position, an arresting cable and an activating cable above said arresting cable spanning said support members, each of said support members being provided with respective carrying means for said arresting cable displaceable longitudinally of said members from a lowered position of said arresting cable to an elevated position thereof, and transmission means operatively connected to said activating cable for upwardly displacing said carrying means upon entrainment of said activating cable by an aircraft in said erect position of said support members.

4. An aircraft barrier comprising a pair of generally tubular support members disposed at opposite sides of a runway, each of said members being pivoted at one extremity for angular displacement from an inoperative, substantially horizontal position to an operative, erect position, an arresting cable and an activating cable above said arresting cable spanning said support members, a pair of pistons axially displaceable within respective ones of said members and carrying said arresting cable, and transmission means operatively connected to said activating cable for displacing said pistons within said members from a lower, first axial position of said pistons to an elevated, second axial position thereof upon entrainment of said activating cable by an aircraft.

5. An aircraft barrier according to claim 4, further comprising locking means on said support members for yieldably securing said pistons at one of said axial positions.

6. An aircraft barrier according to claim 5 wherein said locking means are positioned to engage said pistons at said first axial positions thereof and are disengageable from said pistons upon the stressing of said activating cable with a tension in excess of a predetermined minimum tension.

7. An aircraft barrier according to claim 4, further comprising first and second locking means on each of said support members for securing said pistons at said first and second axial positions, respectively.

8. An aircraft barrier according to claim 4, wherein said transmission means comprises a block-and-tackle mechanism at each extremity of said activating cable, each of said mechanisms being provided with a flexible member secured to a respective one of said pistons.

9. An aircraft barrier according to claim 4, further comprising latch means for holding said support members in said inoperative position, and resilient tensioning means tied to each of said support members at a location intermediate its extremities for erecting said support members upon the inactivation of said latch means.

10. An aircraft barrier according to claim 9 wherein each of said resilient tensioning means comprises a damping device adapted to slow the rate of erection of said support members.

11. An aircraft barrier according to claim 9, further comprising a remote-control means for inactivating said latch means.

12. An aircraft barrier comprising a pair of upright support members disposed at opposite sides of a runway, an arresting cable and an activating cable spanning said support members, each of said support members being provided with respective carrying means, shearable link means securing said arresting cable to said carrying means, said carrying means being displaceable on said supporting members from a lowered position to an elevated position, and transmission means operatively coupling said activating cable to said carrying means for displacing said carrying means from said lowered position to said elevated position upon entrainment of said activating cable by an aircraft.

13. An aircraft barrier according to claim 12 wherein said transmission means comprises a block-and-tackle mechanism at each extremity of said activating cable, each of said mechanisms being provided with a flexible member secured to a respective one of said carrying means.

14. An aircraft barrier according to claim 13 wherein said transmission means further comprises other shearable link means between each of said mechanisms and a respective extremity of said activating cable.

References Cited in the file of this patent
UNITED STATES PATENTS

| | | |
|---|---|---|
| 2,854,201 | Cotton | Sept. 30, 1958 |
| 2,919,871 | Sorensen | Jan. 5, 1960 |

OTHER REFERENCES

Aviation Week, pp. 86–87, Sept. 23, 1957.